(12) United States Patent
Deb et al.

(10) Patent No.: US 11,200,128 B2
(45) Date of Patent: Dec. 14, 2021

(54) NETWORK INTERFACE DEVICE AND METHOD FOR OPERATING A NETWORK INTERFACE DEVICE

(71) Applicant: NXP B.V., Eindhoven (NL)

(72) Inventors: Abhijit Kumar Deb, Eindhoven (NL); Hubertus Gerardus Hendrikus Vermeulen, Eindhoven (NL); Lucas Pieter Lodewijk van Dijk, Kranenburg (DE)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 16/115,058

(22) Filed: Aug. 28, 2018

(65) Prior Publication Data

US 2020/0073774 A1 Mar. 5, 2020

(51) Int. Cl.
*G06F 11/263* (2006.01)
*G06F 11/273* (2006.01)
*G06F 11/277* (2006.01)
*H04L 12/40* (2006.01)

(52) U.S. Cl.
CPC .......... *G06F 11/263* (2013.01); *G06F 11/277* (2013.01); *G06F 11/2733* (2013.01); *H04L 12/40* (2013.01); *H04L 2012/40215* (2013.01)

(58) Field of Classification Search
CPC .. G06F 11/2733; G06F 11/263; G06F 11/277; G06F 11/3684; G06F 11/3688; G06F 11/3612; G06F 11/261; G06F 9/3877; H04L 12/40; H04L 2012/40215
See application file for complete search history.

(56) References Cited

U.S. PATENT DOCUMENTS 9,226,295 B2 * 12/2015 Negus .................. H04J 1/00
2004/0232770 A1   11/2004 Gisy et al.
2010/0229038 A1    9/2010 Mayer et al.
2015/0095711 A1 *  4/2015 Elend .............. G06F 13/4072
                                                      714/39

(Continued)

FOREIGN PATENT DOCUMENTS

DE         19642843 A1     4/1998

OTHER PUBLICATIONS

T.D. Ter Braak, S.T. Burgess, H. Hurskainen, H.G. Kerkhoff, B. Vermeulen, X. Zhang, "On-line dependability enhancement of multiprocessor SoCs by resource management," in proc. Int. Symp. on System on Chip, pp. 103-110, 2010.

X. Zhang, H.G. Kerkhoff, B. Vermeulen, "On-chip Scan-Based Test Strategy for a Dependable Many-Core Processor Using a NoC as a Test Access Mechanism," in proc. Euromicro Conf. on Digital System Design: Architectures, Methods and Tools, pp. 531-537,2010.

(Continued)

*Primary Examiner* — Matthew M Kim
*Assistant Examiner* — Matthew N Putaraksa

(57) ABSTRACT

Embodiments of a device and method are disclosed. In an embodiment, a network interface device is disclosed. The device includes a network interface configured to provide an interface to a network, a functional component interface configured to provide an interface to a functional component, and distributed test logic located in a path between the network interface and the functional component interface and configured to manage test information related to testing of the functional component and to communicate test information between the network interface and the distributed test logic and between the functional component interface and the distributed test logic.

20 Claims, 12 Drawing Sheets

(56) References Cited

U.S. PATENT DOCUMENTS

| | | | |
|---|---|---|---|
| 2016/0011232 A1* | 1/2016 | Marques Martins | G01R 1/0416 324/754.03 |
| 2016/0173295 A1* | 6/2016 | Hartwich | H04L 12/4135 370/503 |
| 2017/0018213 A1* | 1/2017 | Yang | G09G 3/00 |
| 2017/0235698 A1* | 8/2017 | van der Maas | H04L 63/14 710/106 |
| 2017/0269147 A1* | 9/2017 | Rezgui | G01R 31/2834 |
| 2017/0331699 A1 | 11/2017 | Lee et al. | |
| 2018/0132119 A1* | 5/2018 | Mylsamy | H04W 24/08 |
| 2018/0176627 A1* | 6/2018 | Hicks | H04B 1/18 |
| 2018/0268174 A1* | 9/2018 | Bathurst | G06F 21/81 |
| 2018/0270169 A1* | 9/2018 | Daugherty, III | H04L 12/2823 |
| 2019/0288870 A1* | 9/2019 | de Haas | H04B 3/46 |
| 2019/0385057 A1* | 12/2019 | Litichever | G06N 3/08 |

OTHER PUBLICATIONS

A. Cook, M. Elm, H.J. Wunderlich, and U. Abelein, "Structural In-Field Diagnosis for Random Logic Circuits," in proc. IEEE European Test Symp., pp. 111-116, 2011.

U. Abelein, A. Cook, P. Engelke, M. Glass, F. Reimann, L.R. Gomez, T. Russ, J. Teich, D. Ull, H.J. Wunderlich, "Non-Intrusive integration of advanced diagnosis features in automotive E/Earchitectures," in proc. Design, Automation & Test in Europe Conf. (DATE), pp. 1-6, 2014.

C. Gleichner, H.T. Vierhaus, p. Engelke, "Scan Based Tests via Standard Interfaces," in proc. Euromicro Conf. on Digital System Design, pp. 844-851, 2012.

Mishra, Geetishree et al.; "Deploying Health Monitoring ECU Towards Enhancing the Performance of In-Vehicle Network"; 7 pages; 2012.

* cited by examiner

NETWORK INTERFACE DEVICE AND METHOD FOR OPERATING A NETWORK INTERFACE DEVICE

BACKGROUND

In the push towards smarter automobiles that can implement advanced features such as driver assistance and autonomous driving, many electronic components are being utilized. Electronic components, often referred to as Electronic Control Units (ECUs) are used in, for example, vision systems (cameras, radar, LIDAR), anti-lock braking systems, airbag systems, and infotainment systems and include Functional Components (FCs), such as microcontrollers (MCUs), smart sensors, and smart actuators. ECUs are connected to each other by an in-vehicle network (IVN) that enables the ECUs to communicate. In-vehicle network technologies include, for example, Controller Area Network (CAN), FlexRay, Local Interconnect Network (LIN), and Ethernet.

To ensure the safety of the next generation of automobiles, the industry is moving to implement International Standardization Organization (ISO) 26262, which is a functional safety standard for electrical and electronic systems. While ISO 26262 works well to ensure the functional safety of electrical and electronic systems, implementing ISO 26262 amongst ECUs that are connected by an in-vehicle network can be challenging.

SUMMARY

Embodiments of a device and method are disclosed. In an embodiment, a network interface device is disclosed. The device includes a network interface configured to provide an interface to a network, a functional component interface configured to provide an interface to a functional component, and distributed test logic located in a path between the network interface and the functional component interface and configured to manage test information related to testing of the functional component and to communicate test information between the network interface and the distributed test logic and between the functional component interface and the distributed test logic.

In an embodiment, the distributed test logic includes a network protocol controller to decode signals received on the network interface into digital data according to a network protocol.

In an embodiment, the distributed test logic is configured to generate a test vector and to provide the test vector to the functional component interface.

In an embodiment, the distributed test logic includes memory to store a test vector and wherein the distributed test logic is configured to provide the test vector to the functional component interface.

In an embodiment, the distributed test logic is configured to generate a test vector, to provide the test vector to the functional component interface, and to store a test result received at the functional component interface in response to the test vector.

In an embodiment, the distributed test logic is configured to receive a test result from the functional component interface and to store the test result.

In an embodiment, the distributed test logic is configured to receive a test result from the functional component interface and to evaluate the test result.

In an embodiment, the distributed test logic is configured to receive a test result from the functional component interface, to store the test result, and to provide the test result to the functional component interface.

In an embodiment, the functional component interface functions as a data interface and a test interface.

In an embodiment, the functional component interface is a Joint Test Action Group (JTAG) interface and further comprising a second functional component interface, wherein the second functional component interface is a data interface, and wherein the distributed test logic is configured to communicate test vectors to the functional component via the JTAG interface and to receive test results from the functional component via the JTAG interface.

In an embodiment, the functional component interface is a Serial Peripheral Interface (SPI) interface and further comprising a second functional component interface, wherein the second functional component interface is a data interface, and wherein the distributed test logic is configured to communicate test vectors to the functional component via the SPI and to receive test results from the functional component via the SPI.

An embodiment of a method for operating a network interface device that connects a maintenance node on a bus to a functional component is disclosed. The method involves communicating first test information between the maintenance node on the bus and the network interface device via a network interface of the network interface device, communicating second test information between the functional component and the network interface device via a functional component interface, and managing an aspect of testing the functional component in response to at least one of the first test information communicated via the network interface and the second test information communicated via the functional component interface.

In an embodiment, managing an aspect of testing the functional component involves generating a test vector using distributed test logic of the network interface device.

In an embodiment, managing an aspect of testing the functional component involves storing a test vector using distributed test logic of the network interface device.

In an embodiment, managing an aspect of testing the functional component involves storing a test result using distributed test logic of the network interface device, wherein the test result is received from the functional component via the functional component interface.

In an embodiment, the functional component interface includes a receive data interface (RXD) and a transmit data (TXD) interface.

In an embodiment, the functional component interface includes a JTAG interface or a SPI.

A network interface device for an in-vehicle network (IVN) is disclosed. The network interface device includes an IVN interface configured to provide an interface to a bus of an IVN that connects electronic control units (ECUs) on the bus, a data interface configured to provide an interface to a functional component, a secondary interface configured to provide an interface to the functional component, and distributed test logic located in a path between the IVN interface, the data interface, and the secondary interface and configured to manage test information related to testing of the functional component and to communicate test information between the IVN interface and a maintenance ECU on the bus and between the secondary interface and the functional component.

In an embodiment, the secondary interface is a JTAG interface, and wherein the distributed test logic is configured to communicate test information between the functional component and the distributed test logic via the JTAG interface.

In an embodiment, the secondary interface is a SPI, and wherein the distributed test logic is configured to communicate test information between the functional component and the distributed test logic via the SPI.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
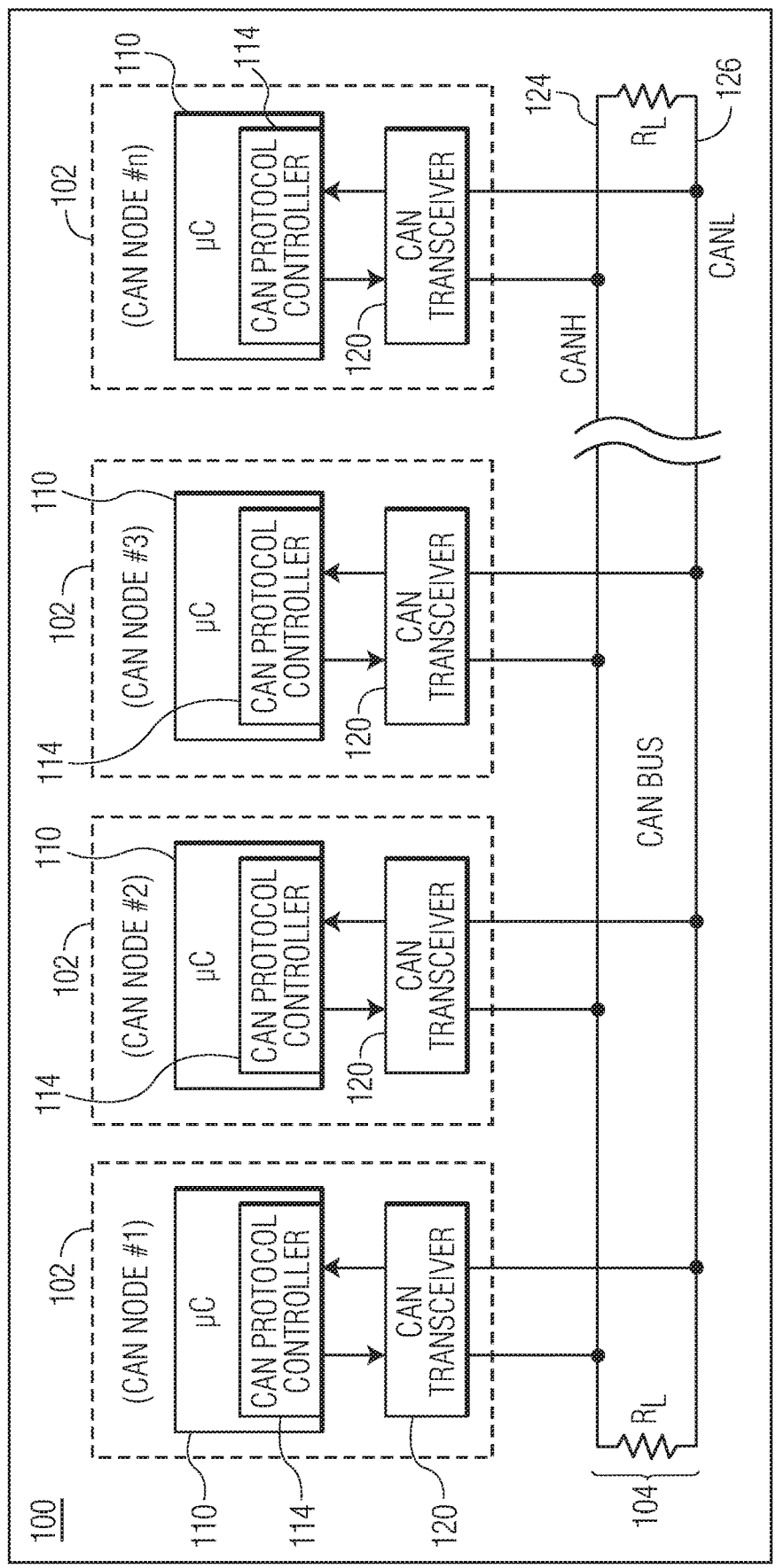
FIG. 1 depicts a CAN network that includes multiple CAN nodes connected to a CAN bus.

FIG. 1 depicts an in-vehicle network (IVN) 100 that implements the CAN protocol and includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
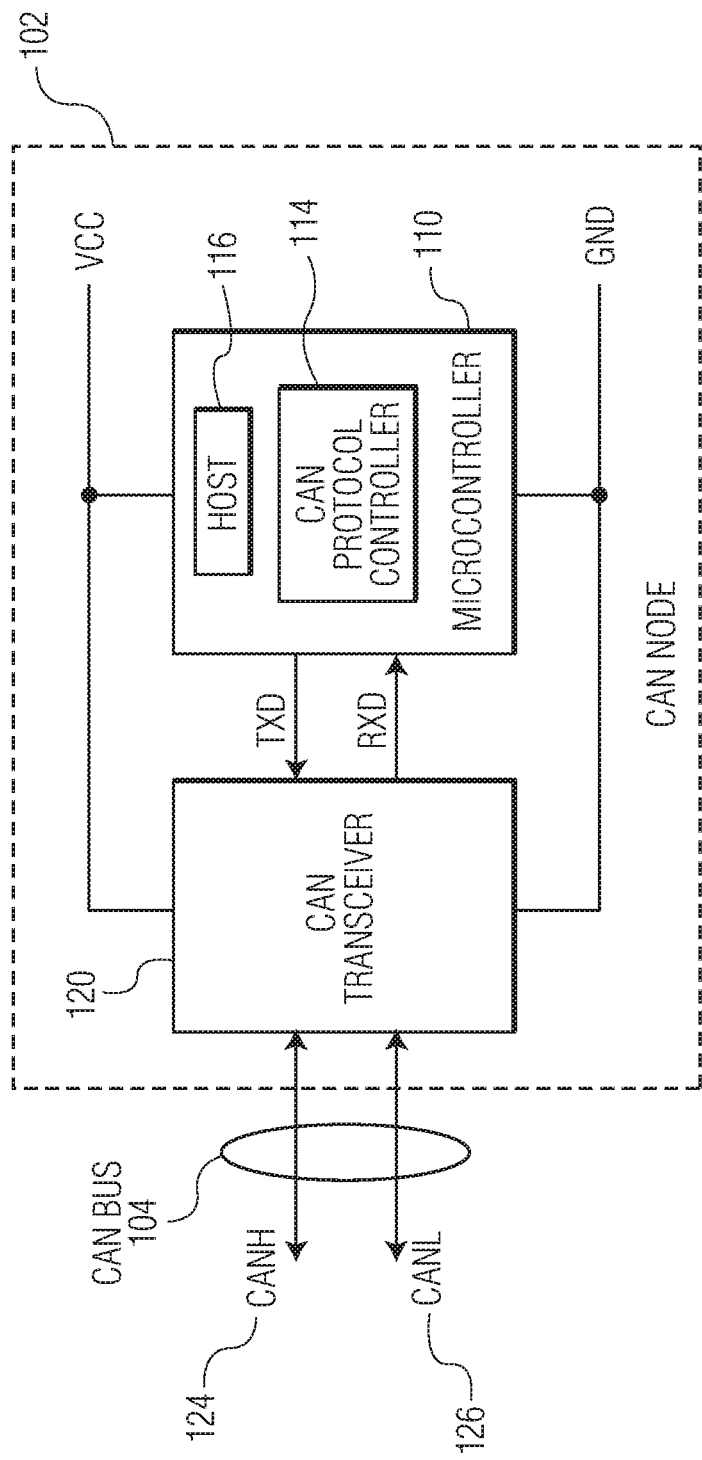
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

In an embodiment, the CAN protocol controller 114 can be configured to support the normal mode and/or the flexible data rate mode. "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-2 standard, or an equivalent thereof.

Emerging automotive applications like Advanced Driver Assistance Systems (ADAS), autonomous driving, and X-by-wire implementations have a need for improved functional safety requirements. Following recommendations in the ISO 26262 standard, the automotive safety integrity level can be improved by implementing health monitoring functionality that detects, for example, single point failures and latent failures.

Health monitors are designed to observe the degradation of functional components due to, for example, wearout. Subsequently, the monitor output can be used to detect a failure or an imminent failure. Available health monitoring techniques require new hardware blocks to be included in the functional component. Sometimes, the new hardware requires an additional interface at the chip-level. As a result, the overall system complexity and the cost increases.

Dependability has been a concern for Multi-Processor System-on-Chip (SoC) (MPSoC) designs where cutting edge CMOS technology is used. On-chip testing techniques for MPSoCs have been proposed for homogeneous MPSoC architectures to improve dependability. Such techniques focus on testing on-chip embedded cores and typically involve generating test stimuli on-chip using a Linear-Feedback Shift Register (LFSR), and applying the test stimuli on the embedded cores. Dedicated testing infrastructure, including test wrappers, is used to apply the test data on the embedded cores-under-test. A Multiple-Input Signature Register (MISR) is used to reduce the volume of test responses generated by the cores. The generated test response signatures are compared with test response signatures from a known fault-free design. Such on-chip testing focuses on the on-chip multi-core architecture. In case a core is found faulty, the core is substituted with another identical core within the MPSoC architecture. Such a technique works for MPSoC architectures with multiple identical cores.

A typical IVN contains a large number of IVN nodes, as referred to as Electronic Control Units (ECUs). The ECUs contain functional components (sometimes referred to simply as "FCs"), such as microcontrollers (MCUs), smart sensors, and smart actuators. The functional components perform different applications and get connected to the IVN via a network interface device (also referred to as a "Bus Interface" or "BI"), such as a CAN transceiver (see FIGS. 1 and 2) or a System Basis Chip (SBC). The IVN provides a shared communication link to exchange data among the ECUs.

As described above, it is desirable to be able to monitor the health of ECUs in an IVN over the life of the ECUs. Testing of ECUs is especially important for safety critical components in a vehicle such as vision systems (cameras, radar, LIDAR), anti-lock braking systems, and airbag systems. A conventional approach to testing ECUs in an IVN involves managing all aspects of ECU testing at a maintenance ECU. For example, the maintenance ECU generates and then transmits test vectors to each ECU at the time the ECU is being tested. Test results are then transmitted from the ECU that is being tested to the maintenance ECU after the test results are generated. Such a centralized approach to testing ECUs can add a relatively large amount of traffic to the IVN, which has limits on the available bandwidth. Additionally, such a centralized approach to testing ECUs requires that the maintenance ECU has specific knowledge of the testing requirements of each and every ECU that is to be tested. Keeping current on the testing requirements of each and every ECU can be challenging for a maintenance ECU and can limit the flexibility in the design and maintenance of vehicles.

In accordance with an embodiment of the invention, a network interface device for use in, for example, an in-vehicle network, is equipped with distributed test logic that is located in a path between a network interface (e.g., an interface to the in-vehicle network) and a functional component interface (e.g., an interface to the microcontroller). The distributed test logic is configured to manage test information related to testing of the functional component and to communicate test information between the network interface and the distributed test logic and between the functional component interface and the distributed test logic. For example, the distributed test logic is configured to generate and/or store test vectors locally at the network interface device and to store and/or evaluate test results locally at the network interface. Generating test vectors locally at the network interface device can reduce the amount of traffic on the in-vehicle network and storing test vectors locally at the network interface device can provide flexibility as to when the test vectors are transmitted over the in-vehicle network from a maintenance ECU, thus allowing the test vectors to be transmitted from the maintenance ECU when conditions are desirable. Additionally, storing and/or evaluating test results locally at the network interface device can also provide flexibility as to when the test results are transmitted over the in-vehicle network to the maintenance ECU, thus allowing the test vectors to be transmitted when conditions are desirable. Additionally, the distributed test logic for a particular functional component can be preconfigured with test information that is specific to the particular functional component, thereby relieving a maintenance ECU from having to keep track of such functional component-specific testing information. Equipping network interface devices with distributed test logic enables the testing of ECUs in an in-vehicle network to be accomplished in a more distributed manner in which some amount of test related processing and/or storage occurs at the ECUs in the in-vehicle network as opposed to a conventional testing approach in which the testing operations are heavily centralized at the maintenance ECU.

Figure 3:
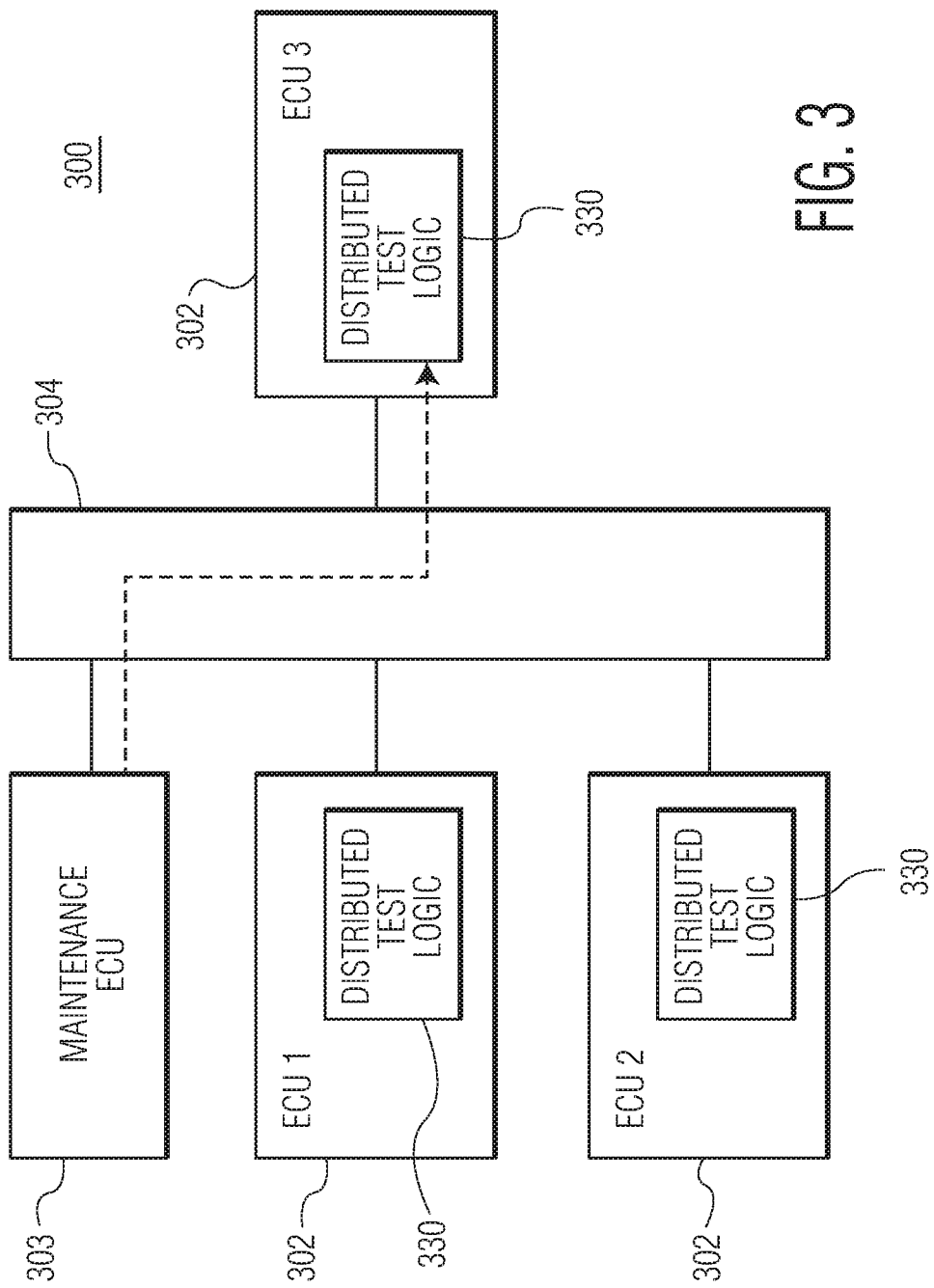
FIG. 3 depicts an example of an in-vehicle network that includes four ECUs connected to the in-vehicle network.

In IVNs, one of the ECUs can be used to initiate or perform the test and diagnosis of other ECUs within the IVN. The ECU that initiates or performs the test and diagnosis is often referred to as a maintenance ECU. FIG. 3 depicts an example of an IVN 300 that includes four ECUs connected to a bus 304. The four ECUs include a maintenance ECU 303 and three other ECUs 302 that are configured to perform a specific function or functions, sometimes referred to as functional ECUs. In an embodiment, the maintenance ECU initiates a test by sending a request to one of the ECUs (e.g., ECU 3) as indicated by the dashed line 305. The request may cause the ECU to enter a pre-defined test mode. Then, the maintenance ECU may send test stimuli to the ECU. The network interface device may apply the test stimuli received from the maintenance ECU or test stimuli generated/stored within the network interface device to the functional component and the network interface device collects the test response or responses. Test responses collected at the network interface device are communicated to the maintenance ECU via the IVN. In the embodiment of FIG. 3, the three functional ECUs are equipped with distributed test logic 330 that is configured to support some amount of test related processing and/or storage. Equipping the functional ECUs with distributed test logic creates a distributed test architecture that can improve the performance of an in-vehicle network.

Figure 4A:
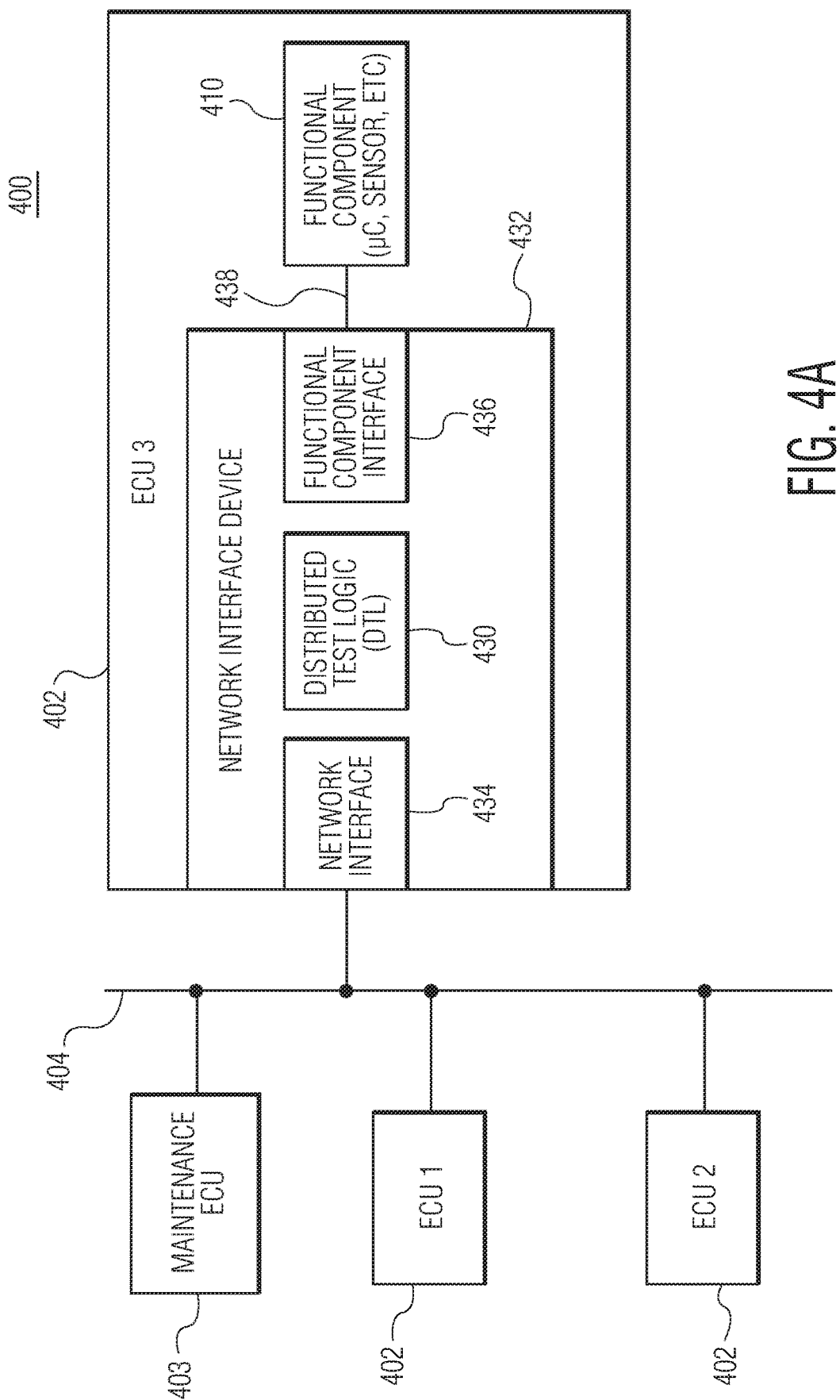
FIG. 4A depicts the in-vehicle network from FIG. 3 with an expanded view of one of the ECUs.

FIG. 4A depicts an IVN 400 similar to the IVN 300 from FIG. 3 with an expanded view of one of the ECUs (ECU 3). In the expanded view of FIG. 4A, the ECU 402 includes a network interface device 432 and a functional component 410. The functional component 410 is a component such as a microcontroller, a sensor, and/or an actuator as is known in the field. The network interface device provides an interface between the IVN and the functional component of the ECU. In the embodiment of FIG. 4A, the network interface device 432 includes a network interface 434, distributed test logic (DTL) 430, and a functional component interface 436. The network interface provides an interface to the physical bus 404 of the IVN. For example, the network interface includes physical interfaces to the wire or wires that make up the physical network medium of the IVN and the network interface includes a transmitter and a receiver (transceiver) that convert signals between the ECU and the transmission medium of the IVN. In an embodiment, the network interface is embodied as a CAN transceiver as described above with reference to FIGS. 1 and 2. The distributed test logic is located in a path (e.g., a signal path or a data path) between the network interface 434 and the functional component interface 436 and is configured to manage test information related to testing of the functional component and to communicate test information between the network interface 434 and the distributed test logic 430 and between the functional component interface 436 and the distributed test logic 430. The functional component interface 436 provides an interface to a bus 438 that connects between the network interface device 432 and the functional component 410. In an embodiment, the functional component interface 436 is embodied as an RXD interface and a TXD interface as specified by the CAN protocol. In an embodiment in which the network interface device and the functional component are separate IC devices attached to the same printed circuit board (PCB), the functional component interface includes conductive pads for physical and electrical connection to conductive traces on the PCB.

Figure 4B:
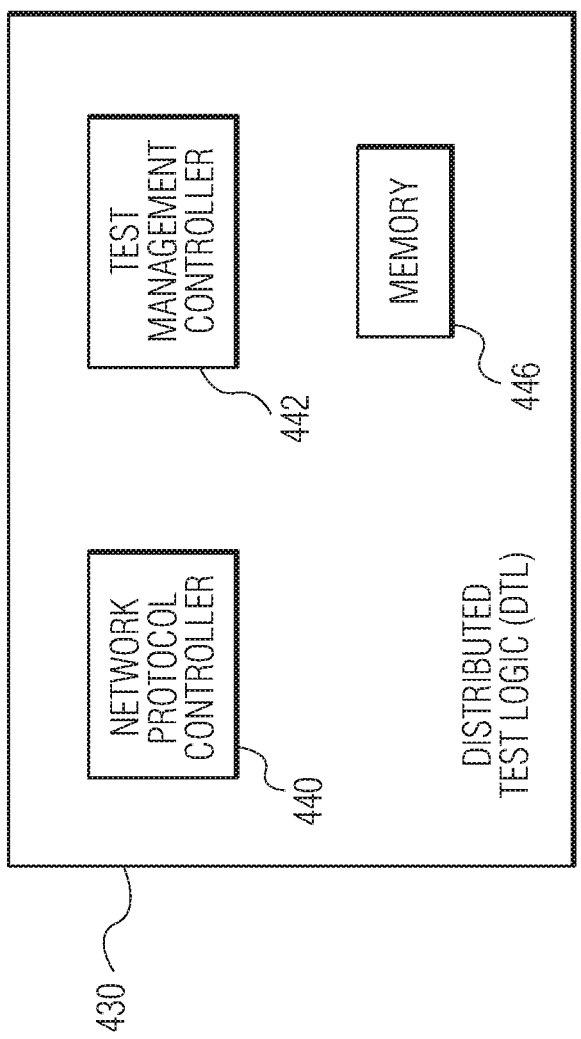
FIG. 4B is an expanded view of an embodiment of the distributed test logic from FIG. 4A.

FIG. 4B is an expanded view of an embodiment of the distributed test logic 430 from FIG. 4A. In the embodiment of FIG. 4B, the distributed test logic 430 includes a network protocol controller 440, a test management controller 442, and memory 446. The network protocol controller 440 is configured to decode signals received on the IVN into digital data that can be interpreted by the functional component. In an embodiment, the network protocol controller is a CAN protocol controller that is configured to decode the signals on the CAN bus into digital data (e.g., RXD) according to the CAN protocol. As is described in more detail below, in an embodiment, the network protocol controller is configured to decode incoming signals into digital data (e.g., RXD) but is not configured to encode signals for transmission on the IVN, thus eliminating the need for precise timing logic that is needed for data transmission. In another embodiment, the network protocol controller is configured to decode incoming signals on the IVN and is also capable of encoding signals into transmit data (e.g., TXD) for transmission on the IVN.

The test management controller 442 of the distributed test logic 430 is configured to manage aspects of testing the functional component. For example, the test management controller may manage the sending of test vectors/stimuli to the functional component, manage the storage of test vectors/stimuli, manage the evaluation of test results/responses, manage the storage of test results/responses, decode a command received via bus 404 to start a test, load test vectors/stimuli, and/or put the functional component into a test mode. Additionally, upon request the test management controller may coordinate transmission of test results to the maintenance ECU 403 via the bus 404.

The memory 446 of the distributed test logic 430 is configured to store digital information, including information related to testing the functional component. In an embodiment, the memory is non-volatile memory such as Flash memory, although the memory may include a combination of volatile and non-volatile memory. The memory may be used to store test vectors (also referred to as test stimuli) that are used to test the functional component and/or to store test results (also referred to as test responses) that are generated from testing the functional component.

Figure 5:
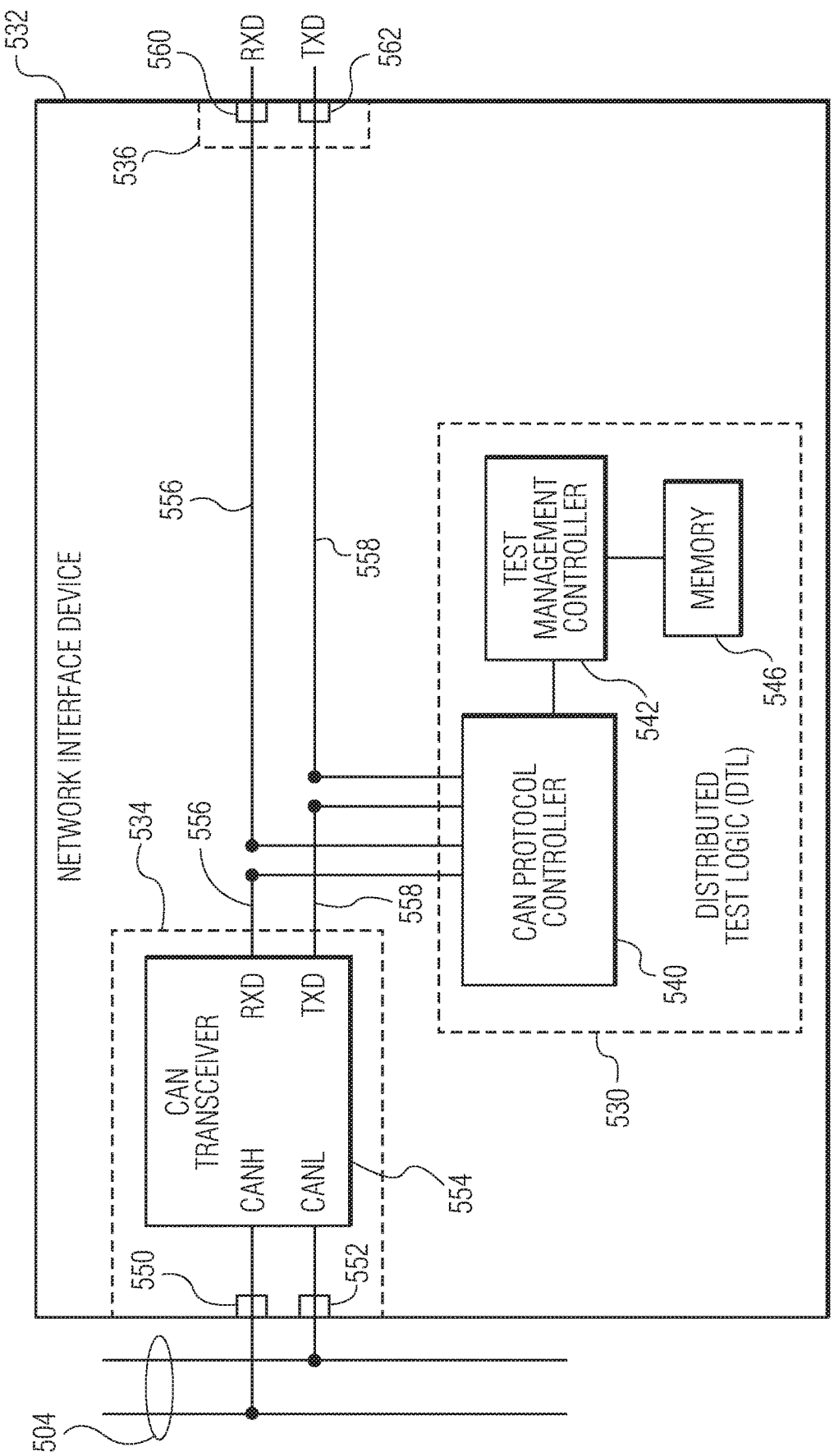
FIG. 5 depicts an embodiment of a network interface device for a CAN network that includes a single functional component interface.

FIG. 5 depicts an embodiment of a network interface device 532 for a CAN network that includes a single functional component interface. In the embodiment of FIG. 5, the network interface device is configured to support the CAN protocol and includes a network interface 534, distributed test logic 530, and a functional component interface 536. The network interface includes a CANH interface 550 (e.g., a CANH pin), a CANL interface 552 (e.g., a CANL pin), and a CAN transceiver 554. The CAN transceiver includes transmitter circuitry and receiver circuitry (not shown), as is known in the field, to convert transmit data (TXD) to CANH and CANL signals in a transmit operation and to convert CANH and CANL signals received on the CAN bus 504 to receive data (RXD) in a receive operation. The receive data, RXD, and transmit data, TXD, are carried on RXD and TXD paths 556 and 558, respectively, within the network interface device.

The functional component interface 536 of the network interface device 532 includes an RXD interface 560 and a TXD interface 562. In an embodiment in which the network interface device is a standalone IC device, the RXD interface 560 is an RXD pin on the IC device and the TXD interface 562 is a TXD pin on the IC device.

The distributed test logic 530 of the network interface device 532 includes a CAN protocol controller 540, a test management controller 542, and memory 546 as described above with reference to FIG. 4B. As shown in FIG. 5, the RXD path 556 and the TXD path 558 run through the CAN protocol controller 540. In an embodiment, the CAN protocol controller 540 can decode signals on the RXD path into digital data and can drive receive data, RXD, on the RXD path 556 to the RXD interface 560. In an embodiment, the CAN protocol controller 540 can generate transmit data, TXD, on the TXD path 558 for transmission by the CAN transceiver 554. In an embodiment, the CAN protocol controller 540 can pass receive data, RXD, through the CAN protocol controller from the CAN transceiver 554 to the RXD interface via, for example, a bypass signal path within the CAN protocol controller. Likewise, in an embodiment, the CAN protocol controller 540 can pass transmit data, TXD, through the CAN protocol controller from the TXD interface 562 to the CAN transceiver 554 via, for example a bypass signal path within the CAN protocol controller. In an embodiment, the CAN protocol controller 540 has no ability to generate transmit data, TXD, as generating transmit data, TXD, may require precise timing components.

The test management controller 542 of the distributed test logic 530 is configured to manage test operations related to the functional component. For example, the test management controller may manage the sending of test vectors/stimuli to the functional component, manage the storage of test vectors/stimuli in the memory 546, manage the evaluation of test results/responses, and/or may manage the storage of test results/responses. In an embodiment, the CAN protocol controller 540 of the network interface device 532 acts as the master of communications between the CAN protocol controller of the network interface device and a CAN protocol controller of the functional component.

In the embodiment of FIG. 5, all test information, e.g., test vectors and test results, are communicated to/from the functional component (not shown) via the functional component interface 536. For example, the test management controller 542 can generate a test vector and provide the test vector to the functional component via the CAN protocol controller 540 and the RXD path 556. Test results may be provided from the functional component to the test management controller 542 of the network interface device 532 via the TXD path 558 and the CAN protocol controller 540. In an embodiment in which the distributed test logic has no transmit ability, when it is desirable to transmit test results from the network interface device to the maintenance ECU, test results are transmitted from the memory 546 of the distributed test logic 530 to the functional component via the RXD path 556 and then the functional component transmits the test results on the TXD path 558 using the CAN protocol controller of the functional component. Within the network interface device 532, the test results are "passed through" the CAN protocol controller 540 from the TXD interface 562 to the CAN transceiver 554 via, for example a bypass signal path within the CAN protocol controller. Using such an approach enables the test results to be stored in the memory in the network interface device and transmitted at a desirable time to the maintenance ECU without having to equip the distributed test logic with the precise timing circuitry that is needed to transmit data, thus taking advantage of the capabilities of the CAN protocol controller that already exists within the functional component.

Figure 6:
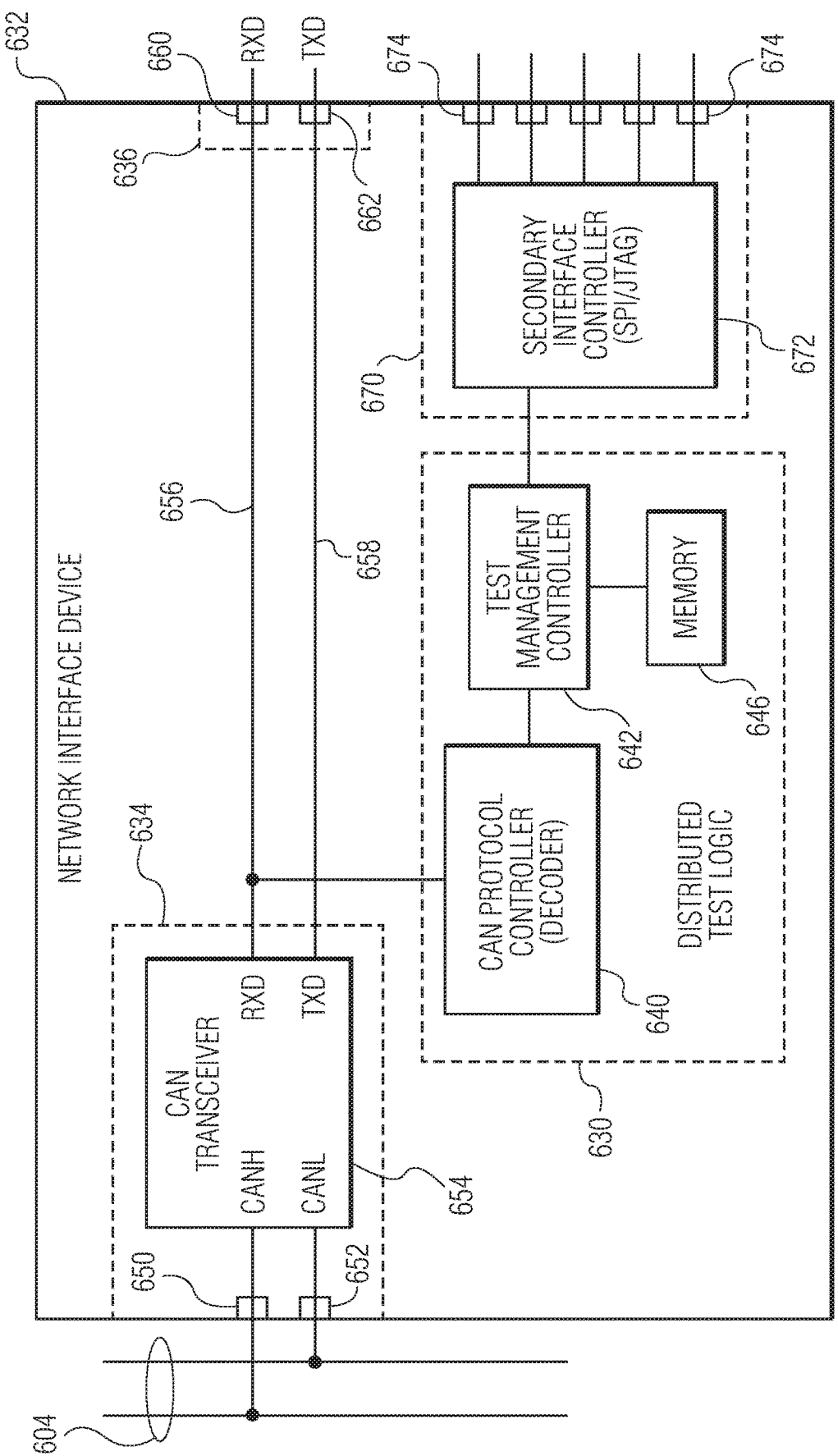
FIG. 6 depicts an embodiment of a network interface device for a CAN network that includes a primary functional component interface and a secondary functional component interface.

FIG. 6 depicts an embodiment of a network interface device 632 for a CAN network that includes two functional component interfaces, a primary functional component interface 636 or data interface such as an RXD/TXD interface and a secondary functional component interface 670 such as, for example, a Serial Peripheral Interface (SPI) or a Joint Test Action Group (JTAG) interface. In the embodiment of FIG. 6, the network interface device is configured to support the CAN protocol and includes a network interface 634, distributed test logic 630, the primary functional component interface 636 (e.g., an RXD/TXD interface) and the secondary functional component interface 670 (e.g., a SPI or a JTAG interface). The network interface includes a CANH interface (e.g., a CANH pin), a CANL interface (e.g., a CANL pin), and a CAN transceiver as described above.

The primary functional component interface 636 of the network interface device 632 includes an RXD interface 660 and a TXD interface 662 as specified by the CAN protocol. In an embodiment in which the network interface device is a standalone IC device, the RXD interface 660 is an RXD pin on the IC device and the TXD interface 662 is a TXD pin on the IC device.

The secondary functional component interface 670 of the network interface device 632 includes, for example, an SPI or a JTAG interface. As shown in FIG. 6, the secondary functional component interface includes a secondary interface controller 672 (e.g., an SPI controller or a JTAG controller) and secondary interface pins 674 for connection to corresponding conductive traces/wires. The number of secondary interface pins corresponds to the type of secondary functional component interface that is included in the network interface device. Although the secondary functional component interface 670 is described as an SPI or a JTAG interface, other types of interfaces, including for example, a single-wire interface, may be utilized. In an embodiment, it can be advantageous to include a secondary functional component interface that is compatible with a secondary interface that already exists on an IC device of the functional component. Including a secondary interface on the network interface device that is compatible with an interface that already exists on the functional component IC device enables the network interface device to implement testing activities without physically altering the interface/pin configuration of the functional component IC device.

In an embodiment, the secondary functional component interface 670 of the network interface device 632 is a standard SPI as is known in the field. For example, the SPI includes four conductive connection pins 674 for communicating four signals between two components, the four conductive connections and corresponding signals being referred as the Serial Clock (SCLK), the Master Output Slave Input (MOSI), the Master Input Slave Output (MISO), and the Slave Select (SS). The example shown in FIG. 6 includes five connection pins 674 although in the SPI embodiment, the SPI includes only four connection pins. As is described below, the SPI of the network interface device 632 can be used by the distributed test logic 630 to implement operations related to testing the functional component. In this way, an existing SPI on the functional component can be "repurposed" for testing related operations.

In another embodiment, the secondary functional component interface 670 of the network interface device 632 is a standard JTAG interface as is known in the field, e.g., IEEE 1149.1. For example, the JTAG interface includes five connection pins 674 that connect two components, the five connection pins 674 being referred as the Test Data In (TDI), the Test Data Out (TDO), the Test Clock (TCK), the Test Mode Select (TMS), and the optional Test Reset (TRST). In another embodiment, the JTAG interface includes only two connection pins 674, Test Serial Data (TMSC) and Test Clock (TCKC) as specified in the reduced pin protocol specified in IEEE 1149.7. The example shown in FIG. 6 includes five connection pins 674 although the number of actual pins will correspond to the specific type of interface. As is described below, the JTAG interface of the network interface device 632 can be used by the distributed test logic 630 to implement operations related to testing the functional component. In this way, an existing JTAG interface on the functional component can be used for testing related operations after the functional component has been installed for use, e.g., the JTAG interface of the functional component can be used to perform in-system test of the functional component after the functional component is installed in an automobile.

The distributed test logic 630 of the network interface device 632 includes a CAN protocol controller 640, a test management controller 642, and memory 646 as described above with reference to FIG. 4B. As shown in FIG. 6, the RXD path 656 is connected to the CAN protocol controller 640 such that the CAN protocol controller can decode signals on the RXD path into digital data. In an embodiment, the network interface device does not have the ability to generate transmit data, TXD, because generating transmit data, TXD, may require precise timing components and because test information can be transmitted by the functional component. In an alternative embodiment, the CAN protocol controller has the ability to generate transmit data, TXD.

The test management controller 642 of the network interface device 632 is configured to manage test operations related to the functional component. For example, the test management controller uses the secondary interface controller 672 of the secondary functional component interface 670 to communicate testing information between the distributed test logic 630 of the network interface device 632 and testing infrastructure of the functional component.

In the embodiment of FIG. 6, test information, e.g., test vectors and test results, are communicated to/from the functional component via the secondary functional component interface 670 (e.g., SPI/JTAG interface). For example, the test management controller 642 can generate a test vector and provide the test vector to the functional component via the secondary functional controller interface 670 (e.g., SPI/JTAG interface). Test results may be provided from the functional component to the test management controller 642 of the network interface device 632 via the secondary functional component interface 670 (e.g., SPI/JTAG interface). In an embodiment in which the distributed test logic 630 has no transmit ability, when it is desirable to transmit test results from the network interface device 632 to the maintenance ECU, test results are transmitted from the memory 646 of the distributed test logic to the functional component via the secondary functional component interface 670 (e.g., SPI/JTAG interface) and then the functional component transmits the test results on the TXD path 658 using the CAN protocol controller of the functional component. Using such an approach enables the test results to be stored in the memory 646 in the network interface device 632 and transmitted at a desirable time to the maintenance ECU without having to equip the distributed test logic 630 with the precise timing circuitry that is needed to transmit data, thus taking advantage of the capabilities of the CAN protocol controller that already exists within the functional component. In an embodiment, a desirable time to transmit test results on the IVN may be when network traffic is low and/or when the vehicle is in a low safety risk mode, e.g., when the vehicle is parked.

Figure 7:
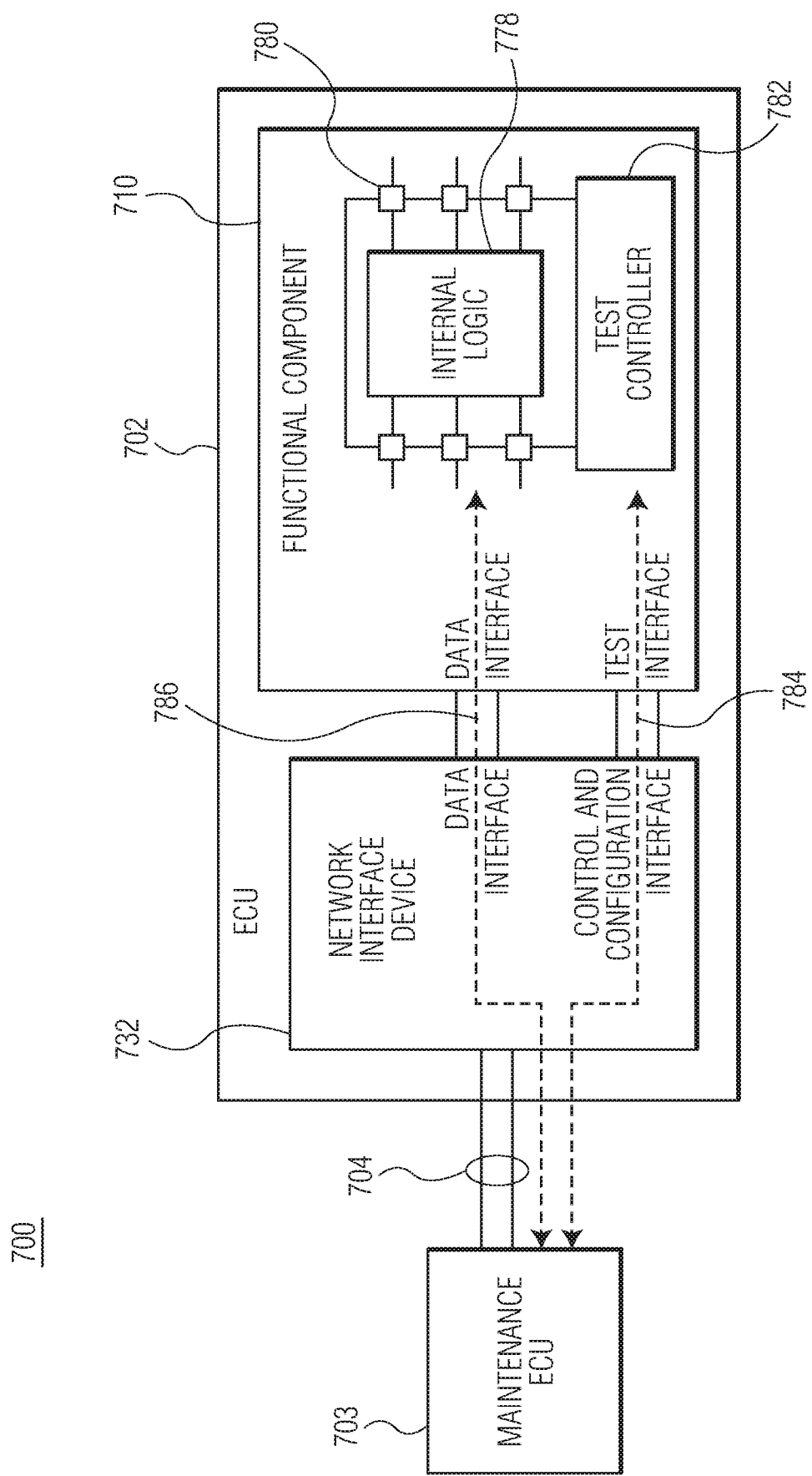
FIG. 7 illustrates the testing of a functional component of an ECU in an in-vehicle network utilizing a network interface device in the ECU that interfaces between the functional component of the ECU and a maintenance ECU.

FIG. 7 illustrates the testing of a functional component 710 of an ECU 702 in an IVN 700 utilizing a network interface device 732 in the ECU that interfaces between the functional component of the ECU and a maintenance ECU 703. In an embodiment, the network interface device 732 is a network interface device as described above with reference to FIGS. 4A, 4B, and 6 in which the network interface device includes a primary functional component interface (e.g., a data interface such a CAN protocol RXD/TXD interface) and a secondary functional component interface (e.g., a test interface such as an SPI or JTAG interface). FIG. 7 also shows elements of the functional component including internal logic 778, circuit interfaces 780, and a test controller 782. In the example of FIG. 7, the functional component includes a standardized Design-For-Test (DFT) infrastructure such as the test controller that is typically used for post-production testing of the functional component. For example, microcontrollers for automotive applications typically include testing infrastructure for board-level test using the JTAG standard (IEEE 1149.1) and/or intellectual property (IP)-level test using the IJTAG standard (IEEE 1687) and the Embedded Core Test standard (IEEE 1500). In the example of FIG. 7, only a single functional ECU 702 is shown although it should be understood that multiple functional ECUs likely exist on the same IVN as shown, for example, in FIG. 3.

In operation, the maintenance ECU 703 initiates a test to be performed at the ECU 702. An example test information flow is indicated by dashed line 784 and an example functional data flow is indicated by the dashed line 786. The network interface device 732 may receive test stimuli from the maintenance ECU, or generate/store test stimuli locally at the network interface device. The network interface device applies the test stimuli to the functional component via the test and/or data interface(s) of the functional component. The test controller in the functional component applies the test data to the internal logic of the functional component and returns the test response(s) to the network interface device via the test and/or data interface(s). Finally, the test response(s) is/are communicated to the maintenance ECU. In one embodiment, test responses are communicated from the network interface device back to the functional component through the test interface and then transmitted onto the IVN through the data interface of the functional component, through the data interface of the network interface device, and onto the IVN.

In an embodiment, testing can be performed in the field (e.g., while the automobile is in operation) or initiated at a service point. In an example testing operation, a maintenance ECU that is connected to the IVN initiates a test by sending a command through the IVN. The command requests the receiving functional component to initiate the test. Upon receiving the request, the functional component puts itself in a test mode. While doing so, the functional component may re-purpose the function of its primary and secondary interfaces, e.g., the data interface and the test/control/configuration interface to implement functional component testing. Once the functional component is in a test mode, the maintenance ECU may send test stimuli through the IVN to the network interface device that connects the functional component to the IVN. In another embodiment, the network interface device may itself generate test stimuli or retrieve test stimuli from the memory of the distributed test logic. The network interface device applies the test stimuli (e.g., a test vector) at an interface that is connected to the functional component. In one embodiment, the test stimuli is provided to the functional component via the primary functional component interface (e.g., a CAN protocol RXD/TXD interface) and in another embodiment, the test stimuli is provided to the functional component via the secondary functional component interface (e.g., an SPI or a JTAG interface). The test controller of the functional component then applies the test stimuli to the internal logic and returns a test response to the network interface device through the test interface. In an embodiment, the test management controller of the network interface device may evaluate the test response, or test responses. The network interface may transmit the test response, or test responses, to the maintenance ECU through the IVN. The network interface device may also store the test results in the memory for transmission to the maintenance ECU at a desirable time. For example, the transmission of test results from the network interface device may be timed to coincide with periods of low IVN traffic and/or to periods of low risk, e.g., when the vehicle is not moving. In an embodiment, the maintenance ECU signals the end of a test to the network interface device and to the functional component. The maintenance ECU can query the network interface device for test information (e.g., status of a test) and/or test results that may be stored at the network interface device. Eventually, the functional component exits the test mode and re-enters a functional mode, so that normal data communication on the IVN can resume.

As described with reference to FIG. 5, the network interface device 532 may not have a separate control and configuration interface, such as an SPI. In such a case, a "start test" command from a maintenance ECU may indicate the start of a test to the network interface device and to the functional component. The start test command may also cause ownership of the interface to be transferred from the functional component (e.g., from the CAN protocol controller of the functional component) to the network interface device 532 (e.g., to the CAN protocol controller 540 of the distributed test logic 530 of the network interface device). Thus, the network interface device becomes the master of the communication between the network interface device and the functional component (e.g., between the CAN protocol controller of the network interface device and the CAN protocol controller of the functional component). Thus, the functional component interface 536 (e.g., the two pins RXD/TXD 560 and 562) between the network interface device and the functional component is effectively "re-purposed" as a test interface, such as a reduced pin JTAG interface (e.g., IEEE 1149.7), which has only two wires/traces. At this point, the functional component interface 536 (e.g., RXD/TXD) itself serves as the test interface for test control, the application of test stimuli, and the reception of test responses. An "end test" command can be used to indicate the end of the test and to return the ownership of the interface to the functional component, and to return the functional component to its functional mode.

In an embodiment in which the network interface device includes a secondary functional component interface such as a JTAG interface as shown in FIG. 6, a "start test" command from the maintenance ECU indicates the start of a test and the network interface device 632 receives test stimuli from the maintenance ECU through the IVN. The test management controller 642 of the network interface device 632 applies the received test stimuli to, and collects the test result, or test results, from the functional component through the test and/or data interface 670. The network interface device transmits the received test responses on the IVN. In an embodiment, a test result is stored in the memory 646 of the distributed test logic 630 and then retrieved from the memory by the functional component for transmission to the maintenance ECU via the primary functional component interface 636 (e.g., the CAN protocol RXD/TXD interface) of the network interface device. Again, because test results are transmitted onto the IVN via the CAN protocol controller of the functional component, the distributed test logic of the network interface device does not have to have the precise timing circuitry that is required to transmit payload data on the IVN according to the CAN protocol.

In an embodiment in which the network interface device includes a secondary functional component interface such as a SPI as shown in FIG. 6, a "start test" command indicates the start of a test and requests the ownership of the SPI to be transferred from the functional component to the network interface device 632. Once the network interface device becomes the master of the SPI, the SPI is effectively "re-purposed" to a test interface, like a JTAG interface (e.g., an IEEE 1149.1 interface). For example, the SPI contains 4 pins 674, which can be used to implement the JTAG interface as the standard allows the optional TRST pin of the JTAG standard to not be used. Next, the network interface device receives test stimuli from the IVN and applies the test stimuli through the secondary functional component interface 670 (e.g., now a "test" interface), which is realized using the SPI pins. The network interface device also received test results from the functional component and transmits the test results to the maintenance ECU via the IVN. An "end test" command from the maintenance ECU indicates the end of a test and causes the functional component to exit test mode and to enter a functional mode, and returns ownership of the interface from the distributed test logic back to the functional component.

An ECU may enter into a test mode via different techniques. In some embodiments, the maintenance ECU signals to an ECU to put the functional component into a test mode. In one embodiment, a functional component that receives a "start test" signal then sends a test-acknowledgement signal back to the maintenance ECU via the data interface. In another embodiment, a functional component that receives a "start test" signal does not send a test-acknowledgement and the maintenance ECU assumes the functional component has entered a test mode. The absence of subsequent test results from the functional component indicates to the maintenance ECU that the functional component did not enter into test mode or that some other problem exists. In another embodiment, the maintenance ECU uses a status protocol that allows the mode of the functional component that is under test to be queried over the data path, e.g., dashed line 786 in FIG. 7.

An ECU may exit a test mode via different techniques. In one embodiment, the maintenance ECU includes with a "start test" command an indication of the length of the test, which the network interface device and/or the functional component use to determine when to exit the test mode. In another embodiment, the maintenance ECU sends an "end test" command to the ECU to indicate the point in time at which the network interface device and/or the functional component should exit the test mode. In yet another embodiment, the network interface device and the functional component autonomously decide when to exit a test mode, e.g., after a certain pre-configured time interval.

Figure 8:
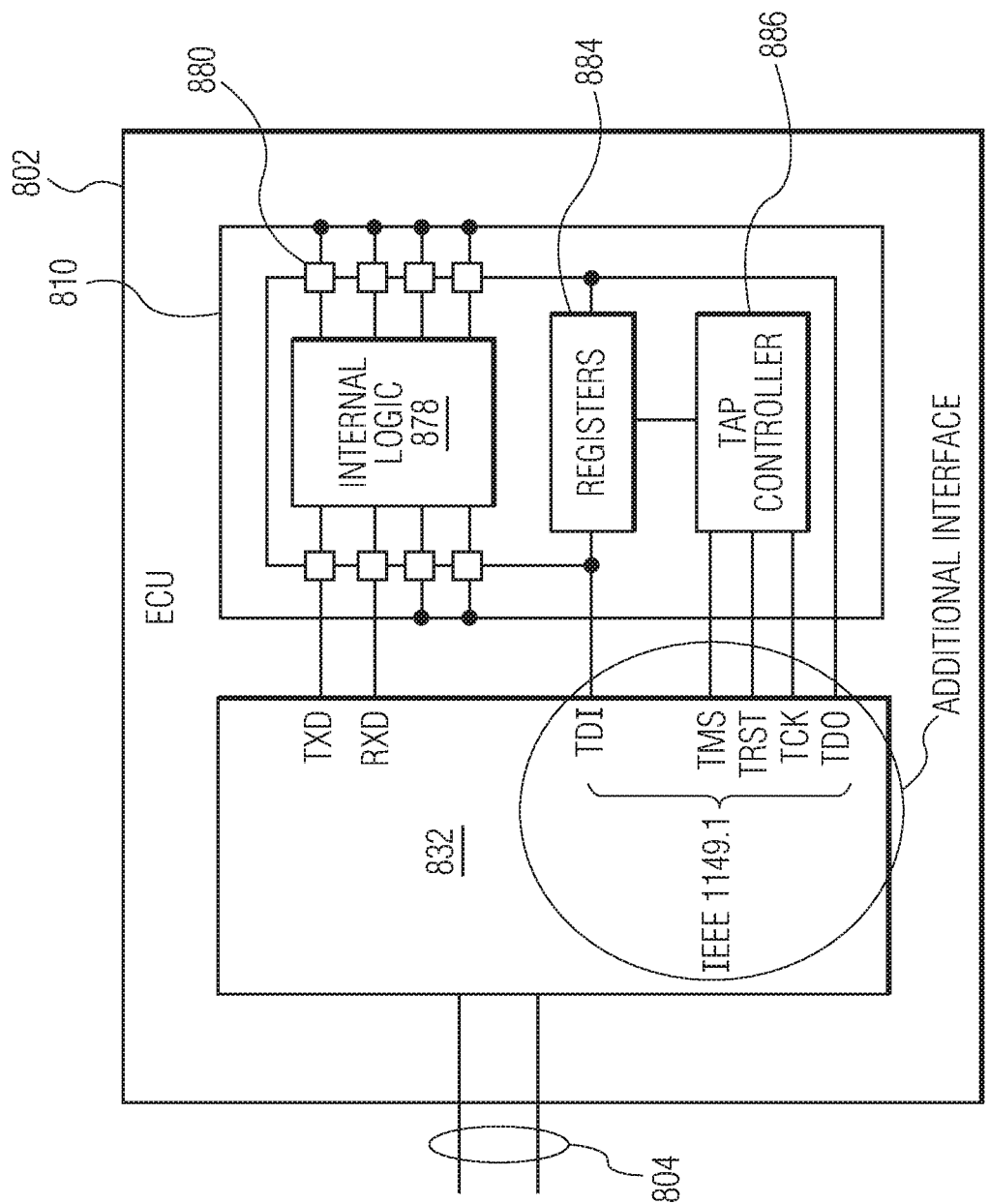
FIG. 8 depicts an embodiment of an ECU in which the network interface device is configured for the CAN protocol and includes a RXD/TXD interface as the primary functional component interface and a JTAG interface as the secondary functional component interface.

FIG. 8 depicts an embodiment of an ECU 802 in which the network interface device 832 is configured for the CAN protocol and includes a RXD/TXD interface as the primary functional component interface and a JTAG interface as the secondary functional component interface. The JTAG interface includes five data paths/pins, TDI, TMS, TRST, TCK, and TDO. In the embodiment of FIG. 8, the network interface device is configured similar to the network interface device described with reference to FIG. 6. FIG. 8 also includes an expanded view of the functional component 810 (e.g., a microcontroller) that includes internal logic 878 and testing infrastructure including registers 884 and a Test Access Port (TAP) controller 886. As depicted in FIG. 8, the TXD interface of the network interface device is connected to an interface of the internal logic of the functional component and the RXD interface of the network interface device is connected to an interface of the internal logic of the functional component. Also, as depicted in FIG. 8, the TDI and TDO interfaces of the network interface device are connected to the registers and to interfaces of the internal logic and the TMS, TRST, and TCK interfaces are connected to the TAP controller. In operation, during a test mode, the network interface device conveys a test vector, which could be generated and/or stored locally at the network interface device, to the functional component via the JTAG interface. The TAP controller in the functional component applies the test vector to the internal logic and returns a test result to the network interface device. The network interface device can save the test response in the memory of the distributed test logic. In an embodiment, the functional component can read the test results from the memory of the network interface device after the functional component exits the test mode and then transmit the test results to a maintenance ECU via the TXD path using the CAN protocol controller that is internal to the microcontroller. In an embodiment, the network interface device can store test results in non-volatile memory, which can be helpful if the self test is conducted as part of a power-down procedure of the functional component. Test results stored at the network interface device after a power down of the functional component can be sent to a maintenance ECU directly from the network interface device or by the functional component after the functional component is powered back up.

Figure 9:
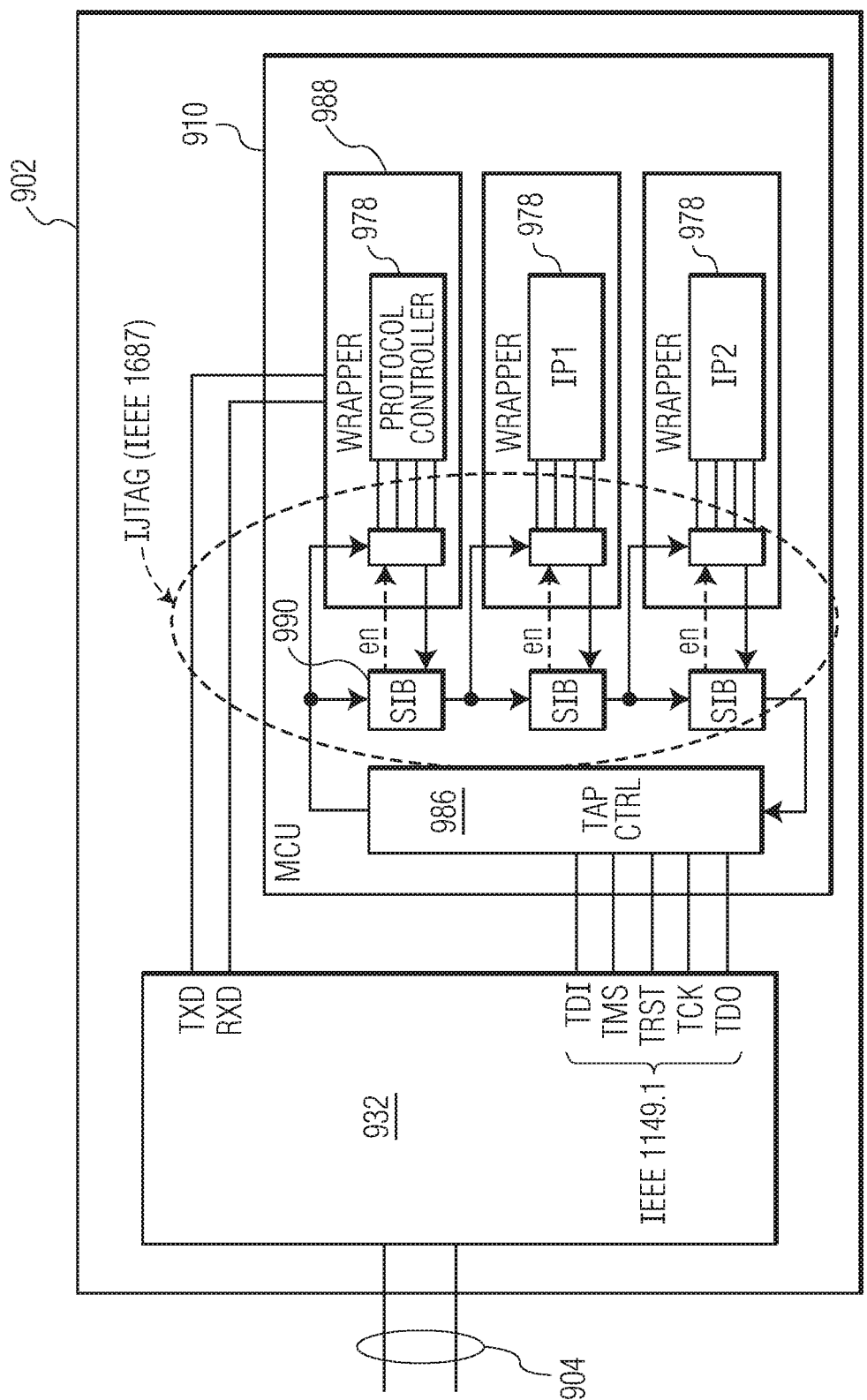
FIG. 9 illustrates how a network interface device can be used to test multiple different IP blocks within a functional component such as a microcontroller of an ECU.

FIG. 9 illustrates how a network interface device 902 as described above can be used to test multiple different IP blocks 978 within a functional component such as a microcontroller 910 of an ECU 902. As shown in FIG. 9, the network interface device is configured for the CAN protocol and includes a RXD/TXD interface as the primary functional component interface and a JTAG interface as the second functional component interface. The JTAG interface includes five data paths/pins, TDI, TMS, TRST, TCK, and TDO. In the embodiment of FIG. 9, the network interface device is configured similar to the network interface device described with reference to FIG. 6. FIG. 9 also includes an expanded view of the functional component (e.g., a microcontroller) that includes multiple different IP blocks (e.g., protocol controller, IP1, and IP2), test wrappers 988, Segment Insertion Bit (SIB) blocks 990, and a TAP controller 986. As depicted in FIG. 9, the TXD and RXD interfaces of the network interface device are connected to the protocol controller and the JTAG interfaces (e.g., the TDI, TMS, TRST, TCK, and TDO interfaces) are connected to the TAP controller. In operation, a test is triggered from a maintenance ECU. During the test mode, the network interface device provides a test vector to the TAP controller via the JTAG interface and the TAP controller applies the test vector to the IP blocks using, for example, the test infrastructure as specified in IEEE 1500/IEEE 1687 (IJTAG). The test infrastructure provides test results to the TAP controller and the TAP controller provides the test results to the network interface device. The network interface device can evaluate, store, and/or pass the test results on to the maintenance ECU. In an embodiment, the network interface device saves the test results in the memory of the distributed test logic so that the test results can subsequently be accessed by the functional component. For example, once the functional component exits the test mode, the functional component reads the test results from the memory of the distributed test logic of the network interface device via the JTAG interface and then the functional component transmits the test results to the maintenance ECU via the protocol controller and the TXD path.

Figure 10:
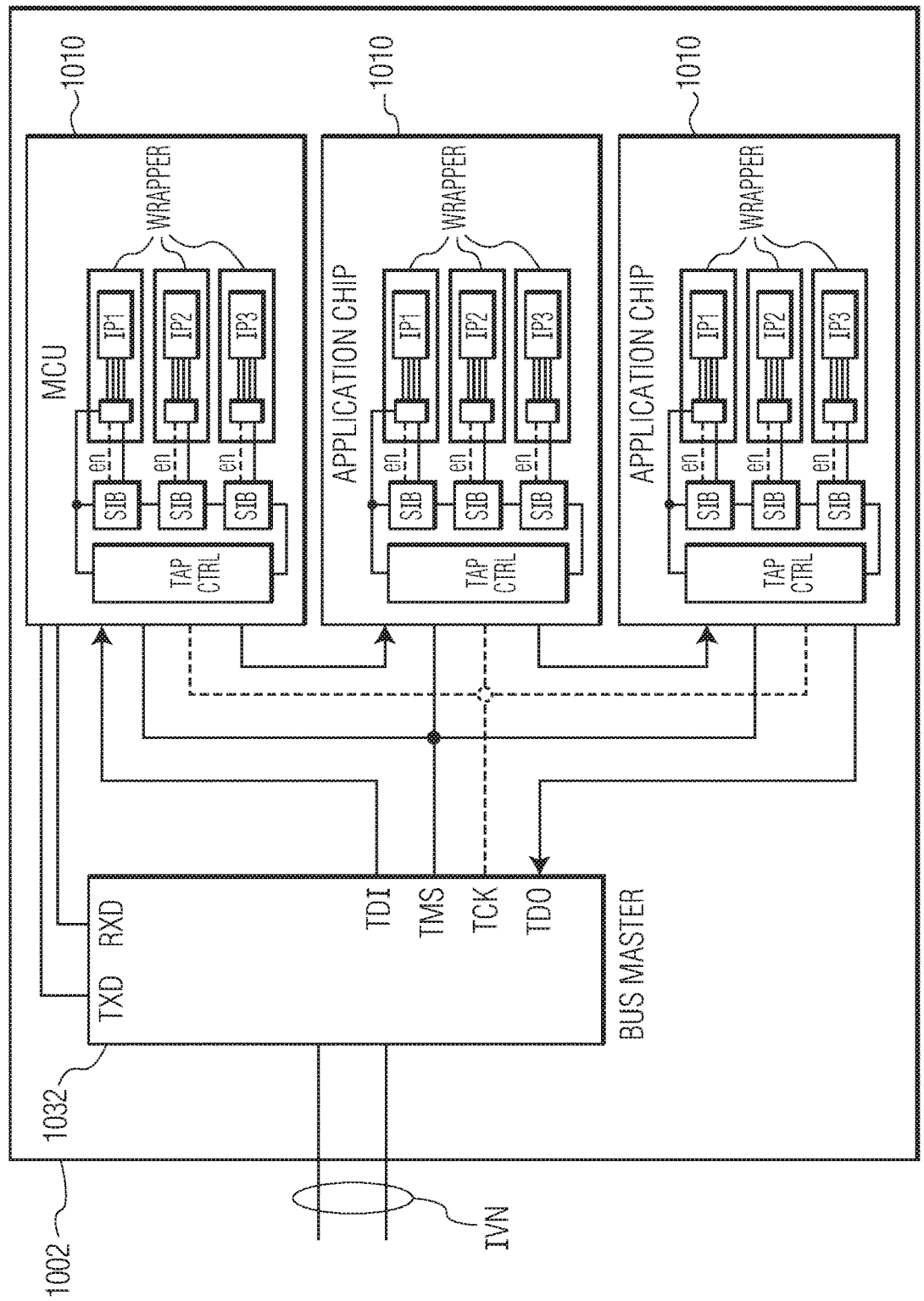
FIG. 10 illustrates how a network interface device can be used to test multiple different IC devices on a printed circuit board.

FIG. 10 illustrates how a network interface device 1032 of an ECU 1002 as described above can be used to test multiple different IC devices on a printed circuit board (PCB). As shown in FIG. 10, the network interface device is configured for the CAN protocol and includes a RXD/TXD interface as the primary functional component interface and a JTAG interface (without the optional TRST pin) as the second functional component interface. The JTAG interface includes four data paths/pins, TDI, TMS, TCK, and TDO. In the embodiment of FIG. 10, the network interface device is configured similar to the network interface device described with reference to FIG. 6. FIG. 10 also includes an expanded view of the three different functional components 1010 (e.g., a microcontroller and two application ICs) that are located in the same ECU, e.g., integrated onto the same PCB. In the example of FIG. 10, each functional component is similar to the functional component described above with reference to FIG. 9. For example, each functional component includes multiple different IP blocks (e.g., IP1, IP2, and IP3), test wrappers, Segment Insertion Bit (SIB) blocks, and a TAP controller. As depicted in FIG. 10, the TXD and RXD interfaces of the network interface device are connected to the protocol controller and the JTAG interfaces (e.g., the TDI, TMS, TRST, TCK, and TDO interfaces) are connected to the functional components. For example, the TDI path is "daisy chained" to the IC devices and the TDO is connected between the last IC device in the daisy chain and the network interface device. The TMS and TCK are shared between the three IC devices. In an embodiment, all three IC devices receive the same TMS and execute the same shift, capture, and update operations. In an embodiment, the different IC devices may receive different test instructions in their instruction registers and execute the different test instructions. During the run-time of tests, the network interface device can act as the bus master to test the different IC devices on the PCB. During post-production board-level test, the external ATPG equipment becomes the bus master and drives the JTAG bus. In an embodiment, the network interface device includes a pin, which configures the device to not act as a bus master during the post-production test. The network interface device pin can be driven by an on-board logic or jumper.

The techniques described herein may have several benefits. For example, the hardware cost to realize such a technique can be minimal, since an existing DFT interface and on-chip infrastructure of the functional component is effectively reused. Also, the technique facilitates the reuse of post-production tests for the in-field testing of ECUs. As a result, the same test vectors can be re-used from the development phase to the field test. Depending on the test vectors, there is an opportunity to perform various test and diagnostics on a connected functional component. As such, single point failures and latent failures can be detected. The ability to detect single point failures and latent failures improves the functional safety of an application. Moreover, since the test stimuli can be generated/stored in the network interface device, which is right next to the corresponding functional component, there is no need to have test stimuli available elsewhere in the IVN. Such a clean separation of concern can simplify managing test procedures of different models and variants of different vehicle brands manufactured by an OEM.

In some cases, there are network interface devices that already include a secondary functional component interface (e.g., a SPI) that can be utilized, or "repurposed," to manage testing of the functional component. This can reduce design effort and can allow a network interface device with the exact same form factor and/or pin out to be equipped with distributed test logic.

The distributed test architecture can simplify the functions of the maintenance ECU and can reduce traffic on the IVN and/or manage traffic based on bandwidth demand/availability.

A network interface device can be configured to take advantage of post-production test infrastructure (DFT infrastructure) on a functional component and can take advantage of interfaces (e.g., SPI/JTAG) on the functional component to implement testing. The technique described herein can effectively reuse the available post-production DFT infrastructure available within a typical functional component to perform in-situ test/diagnosis of a functional component. As a result, a testing technique can be implemented with minimal additional hardware requirements.

The technique does not require an ECU to be taken out of the network to perform the test. Thus, in-system tests of, for example, MCUs, smart sensors, and smart actuators can be performed. Furthermore, the technique relies on the same (or reduced) post-production tests for the in-field test, which saves on test development cost of the in-field test.

As used herein, a test result and a test response may include any information generated as a result of testing a functional component. As used herein, a test stimuli and a test vector may include any information that is used to test a functional component.

The examples of the network interface devices described above are configured for the CAN protocol, however, it should be understood that the invention described herein is also applicable to other in-vehicle network technologies including, for example, FlexRay, Local Interconnect Network (LIN), and Ethernet. Although the technique is described herein with respect to the CAN bus protocol, the technique is applicable to other multi-master bus protocols, including other existing multi-master bus protocols and multi-master bus protocols that may be developed in the future.

As described above with reference to FIGS. 1 and 2, CAN nodes typically include a CAN transceiver, a CAN protocol controller, and a host. Often times the CAN transceiver (or network interface device) is embodied as a separate IC device, the CAN protocol controller and host are embodied as a separate microcontroller IC device, and the transceiver IC and the microcontroller are connected to each other by a PCB to form the CAN node (ECU). Although in one example the network interface device and the functional component are separate IC devices, in another example, the functionality of the network interface device and the functional component my integrated onto the same IC device or partially integrated onto the same IC device.

Figure 11:
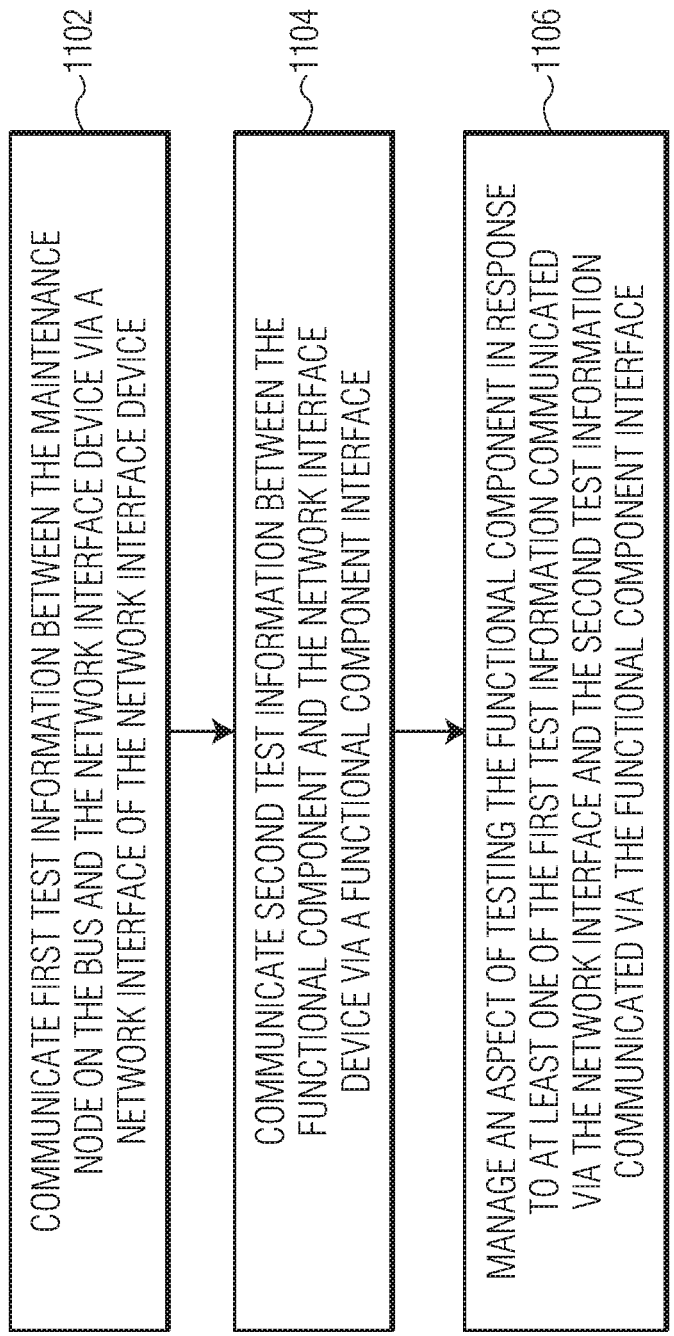
FIG. 11 is a process flow diagram of a method for operating a network interface device that connects a maintenance node on a bus to a functional component.

FIG. 11 is a process flow diagram of a method for operating a network interface device that connects a maintenance node on a bus to a functional component. According to the method, at block 1102, first test information is communicated between the maintenance node on the bus and the network interface device via a network interface of the network interface device. At block 1104, second test information is communicated between the functional component and the network interface device via a functional component interface. At block 1106, an aspect of testing the functional component is managed in response to at least one of the first test information communicated via the network interface and the second test information communicated via the functional component interface.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An Integrated Circuit (IC) device comprising:
 a Controller Area Network (CAN) transceiver configured to provide an interface to a CAN bus, the IC device including a CAN High (CANH) pin and a CAN Low (CANL) pin to interface to the CAN bus;
 a functional component interface configured to provide an interface to a functional component, wherein the functional component interface comprises a receive data (RXD) interface and a transmit data (TXD) interface, wherein the RXD interface is an RXD pin and the TXD interface is a TXD pin; and distributed test logic located in an RXD path between the CAN transceiver and the RXD interface of the functional component interface and configured to manage test information related to testing of the functional component and to communicate test information between the CAN transceiver and the distributed test logic and between the functional component interface and the distributed test logic;

wherein the distributed test logic includes:

a CAN protocol controller to decode signals received on the CAN transceiver into digital data according to a CAN protocol;

a memory to store digital test information related to testing the functional component; and a test management controller to manage test operations related to the functional component, wherein managing test operations include at least one of managing the sending of test vectors to the functional component, managing the storage of test vectors in the memory, managing the evaluation of test results, managing the evaluation of test responses, and managing the storage of test results;

wherein the RXD path includes a first segment that connects the CAN transceiver to the CAN protocol controller and a second segment that directly connects the CAN protocol controller to the RXD interface.

2. The IC device of claim 1, wherein the distributed test logic is configured to generate a test vector and to provide the test vector to the functional component interface.

3. The IC device of claim 1, wherein the memory is configured to store a test vector and wherein the distributed test logic is configured to provide the test vector to the functional component interface.

4. The IC device of claim 1, wherein the distributed test logic is configured to generate a test vector, to provide the test vector to the functional component interface, and to store a test result received at the functional component interface in response to the test vector.

5. The IC device of claim 1, wherein the distributed test logic is configured to receive a test result from the functional component interface and to store the test result.

6. The IC device of claim 1, wherein the distributed test logic is configured to receive a test result from the functional component interface and to evaluate the test result.

7. The IC device of claim 1, wherein the distributed test logic is configured to receive a test result from the functional component interface, to store the test result, and to provide the test result to the functional component interface.

8. The IC device of claim 1, wherein at least one of the RXD interface and the TXD interface functions as a data interface and a test interface.

9. The IC device of claim 1, wherein the functional component interface includes a Joint Test Action Group (JTAG) interface, wherein the RXD interface and the TXD interface are data interfaces, and wherein the distributed test logic is configured to communicate test vectors to the functional component via the JTAG interface and to receive test results from the functional component via the JTAG interface.

10. The IC device of claim 1, wherein the functional component interface includes a Serial Peripheral Interface (SPI), wherein the RXD interface and the TXD interface are data interfaces, and wherein the distributed test logic is configured to communicate test vectors to the functional component via the SPI and to receive test results from the functional component via the SPI.

11. The IC device of claim 1, wherein the CAN protocol controller of the distributed test logic includes a bypass signal path to pass receive data through the CAN protocol controller from the CAN transceiver to the RXD interface.

12. The IC device of claim 11, wherein the CAN protocol controller of the distributed test logic is connected to receive serial data on the RXD path that connects the CAN transceiver to the RXD interface.

13. A method for operating an Integrated Circuit (IC) device that connects a maintenance node on a bus of an in-vehicle network (IVN) to a functional component, the method comprising:

communicating first test information between the maintenance node on the bus and distributed test logic of the IC device via a Controller Area Network (CAN) transceiver of the IC device, the IC device including a CAN High (CANH) pin and a CAN Low (CANL) pin to interface to the bus;

communicating second test information between the functional component and the distributed test logic of the IC device via a functional component interface, wherein the functional component interface comprises a receive data (RXD) interface and a transmit data (TXD) interface, wherein the RXD interface is an RXD pin and the TXD interface is a TXD pin; and managing an aspect of testing the functional component in response to at least one of the first test information communicated via the CAN transceiver and the second test information communicated via the functional component interface;

wherein the distributed test logic includes:

a CAN protocol controller to decode signals received on the CAN transceiver into digital data according to a CAN protocol;

a memory to store digital test information related to testing the functional component; and a test management controller to manage test operations related to the functional component, wherein managing test operations include at least one of managing the sending of test vectors to the functional component, managing the storage of test vectors in the memory, managing the evaluation of test results, managing the evaluation of test responses, and managing the storage of test results;

wherein the distributed test logic is located in an RXD path between the CAN transceiver and the RXD interface, and wherein the RXD path includes a first segment that connects the CAN transceiver to the CAN protocol controller and a second segment that directly connects the CAN protocol controller to the RXD interface.

14. The method of claim 13, wherein managing an aspect of testing the functional component comprises generating a test vector using distributed test logic of the IC device.

15. The method of claim 13, wherein managing an aspect of testing the functional component comprises storing a test vector using distributed test logic of the IC device.

16. The method of claim 13, wherein managing an aspect of testing the functional component comprises storing a test result using distributed test logic of the IC device, wherein the test result is received from the functional component via the functional component interface.

17. The method of claim 13, wherein the functional component interface further comprises a Joint Test Action Group (JTAG) interface or a Serial Peripheral Interface (SPI), wherein at least a portion of one of the first and second test information is communicated via the JTAG interface or the SPI interface.

18. An Integrated Circuit (IC) device for an in-vehicle network (IVN), the IC device comprising:
a Controller Area Network (CAN) transceiver configured to provide an interface to a CAN bus of an IVN that connects electronic control units (ECUs) on the CAN bus, the IC device including a CAN High (CANH) pin and a CAN Low (CANL) pin to interface to the CAN bus;
a receive data (RXD) interface configured to provide an interface to a functional component, wherein the RXD interface is an RXD pin;
a transmit data (TXD) interface configured to provide an interface to the functional component, wherein the TXD interface is a TXD pin;
a secondary interface configured to provide an interface to the functional component; and
distributed test logic located in an RXD path between the CAN transceiver, the RXD interface, and the secondary interface and configured to manage test information related to testing of the functional component and to communicate test information between the CAN transceiver and a maintenance ECU on the CAN bus and between the secondary interface and the functional component;
wherein the distributed test logic includes:
a CAN protocol controller to decode signals received on the CAN transceiver into digital data according to a CAN protocol;
a memory to store digital test information related to testing the functional component; and
a test management controller to manage test operations related to the functional component, wherein managing test operations include at least one of managing the sending of test vectors to the functional component, managing the storage of test vectors in the memory, managing the evaluation of test results, managing the evaluation of test responses, and managing the storage of test results;
wherein the RXD path includes a first segment that connects the CAN transceiver to the CAN protocol controller and a second segment that directly connects the CAN protocol controller to the RXD interface.

19. The IC device of claim 18, wherein the secondary interface is a Joint Test Action Group (JTAG) interface, and wherein the distributed test logic is configured to communicate test information between the functional component and the distributed test logic via the JTAG interface.

20. The IC device of claim 18, wherein the secondary interface is a Serial Peripheral Interface (SPI), and wherein the distributed test logic is configured to communicate test information between the functional component and the distributed test logic via the SPI.

* * * * *